(12) United States Patent
Malmstrom

(10) Patent No.: US 9,011,056 B2
(45) Date of Patent: Apr. 21, 2015

(54) MULTI-FUNCTIONAL BOX STOP DEVICE FOR THE TRUNK OF A CAR

(71) Applicant: Carey D. Malmstrom, Lithonia, GA (US)

(72) Inventor: Carey D. Malmstrom, Lithonia, GA (US)

( * ) Notice: Subject to any disclaimer, the term of this patent is extended or adjusted under 35 U.S.C. 154(b) by 0 days.

(21) Appl. No.: 14/098,001

(22) Filed: Dec. 5, 2013

(65) Prior Publication Data

US 2014/0093323 A1    Apr. 3, 2014

(51) Int. Cl.
*B60P 7/08*           (2006.01)
*B60P 7/135*        (2006.01)

(52) U.S. Cl.
CPC ........................................ *B60P 7/135* (2013.01)

(58) Field of Classification Search
CPC .......... B60P 7/08; B60P 7/0892; B60P 7/135; B60T 3/00; B60R 9/065
USPC ................. 410/90, 91, 94, 95, 102, 121, 155; 188/32; 224/403, 404, 42.33, 901.2; 296/37.6; 248/351, 357
See application file for complete search history.

(56) References Cited

U.S. PATENT DOCUMENTS

| | | | | |
|---|---|---|---|---|
| 4,842,460 A * | 6/1989 | Schlesch | ........................ | 410/121 |
| 5,056,752 A * | 10/1991 | Krause | | |
| 5,662,305 A | 9/1997 | Shimamura et al. | | |
| 6,109,847 A * | 8/2000 | Patel et al. | .................... | 410/129 |
| 6,702,532 B1 * | 3/2004 | Throener | ......................... | 410/94 |
| 7,306,416 B1 * | 12/2007 | Arico | ............................... | 410/94 |

* cited by examiner

*Primary Examiner* — Stephen Gordon
(74) *Attorney, Agent, or Firm* — Jeffrey Watson; Benjamin A. Balser; Balser & Grell IP Law

(57) ABSTRACT

A box stop device includes a base member and a raised member attached to the base member. The base member has a top surface and a bottom surface. The top surface may be flat. The bottom surface may be adapted to attach to a desired surface. The raised member may be attached to the base member and may extend approximately vertically from the top surface. The raised member may include a first side and a second side. The first side and the second side may be attached together at an angle of approximately 90 degrees.

13 Claims, 7 Drawing Sheets

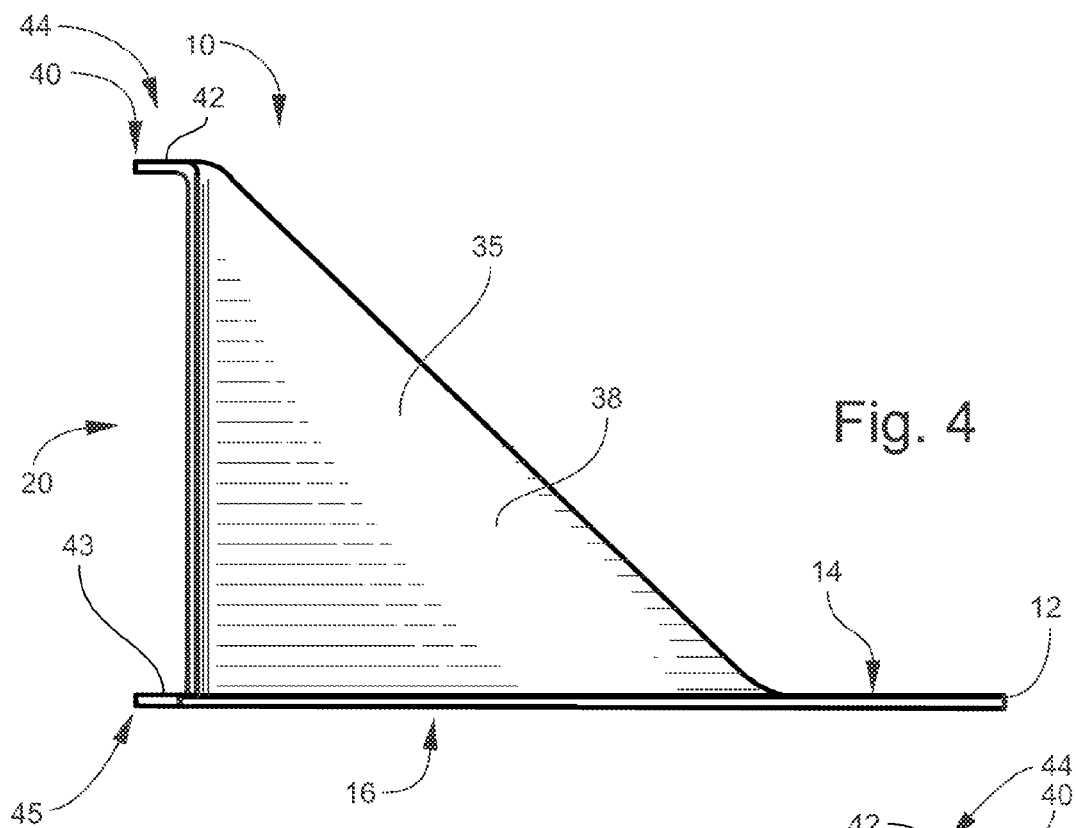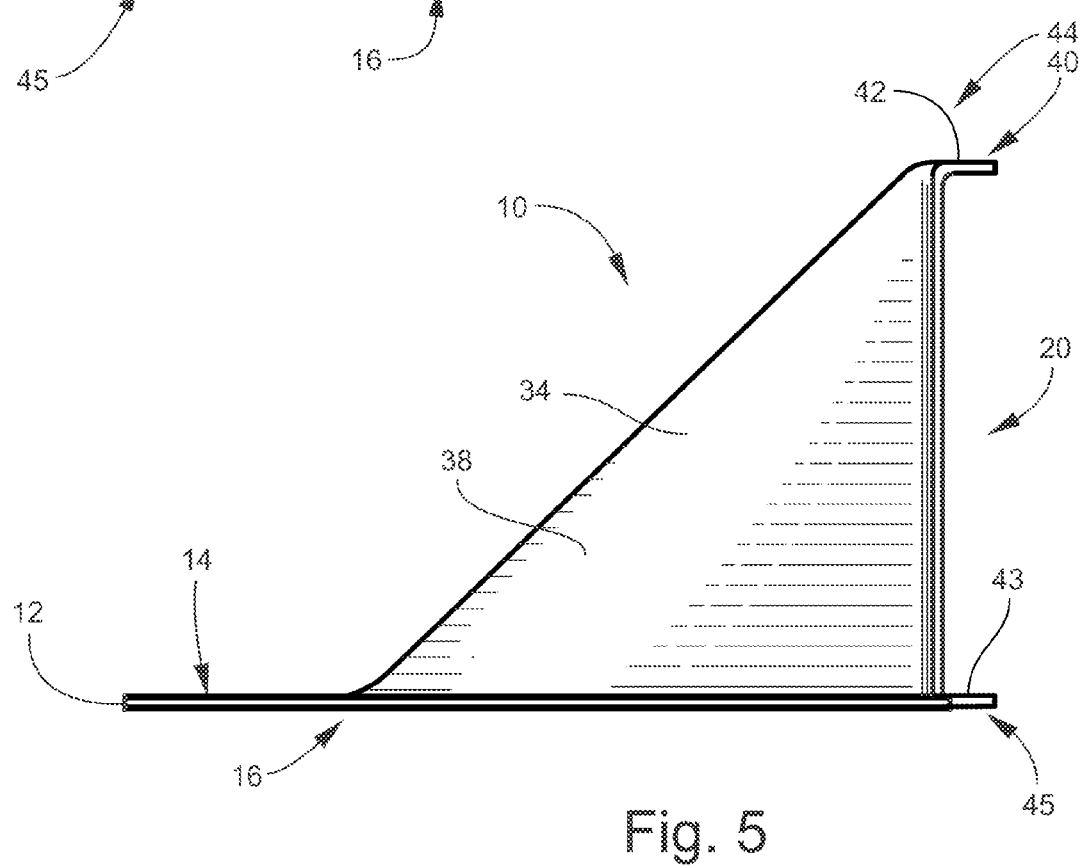

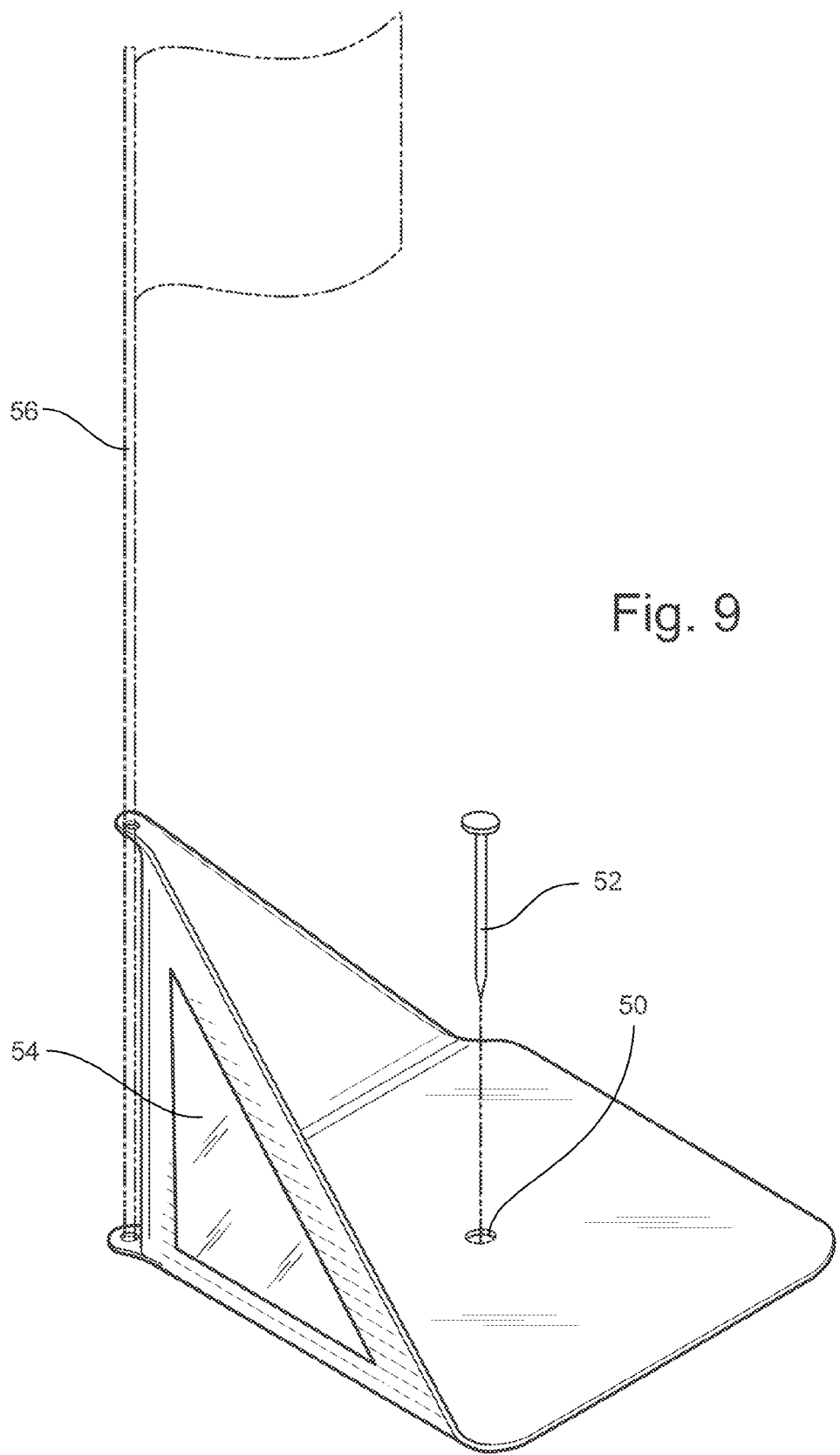

MULTI-FUNCTIONAL BOX STOP DEVICE FOR THE TRUNK OF A CAR

TECHNICAL FIELD OF THE INVENTION

The disclosure generally relates to automobile accessories like trunk accessories, and more specifically to a multi-functional box stop device for the trunk of a car.

BACKGROUND OF THE INVENTION

The trunk, boot or dickie of an automobile or car is the vehicle's main storage compartment. The trunk is most often located at the rear of the vehicle, as storage areas are normally at the end of the vehicle opposite to which the engine is located. Although most cars have the trunk in the rear, some cars have it in the front depending on the location of the engine.

One problem associated with a trunk and the storage of items like boxes in the trunk, is movement of the items or boxes during use of the vehicle. Because of the nature of a car, as it is intended to be driven, forces like acceleration, deceleration, and centrifugal forces are regularly acting on the vehicle and the items inside the trunk. These forces can cause the items in the trunk, like boxes, to shift around during movement of the car. This may be undesired as it can not only cause damage to the box or items inside the box, especially fragile items, but it may also cause damage to the interior of the trunk. As such, it may be desirable to restrain the items or boxes from moving or shifting around in the trunk during operation of the vehicle.

One solution to this problem, especially in open trunks like on station wagons or hatchbacks, is metal grids or guards to retain loose items in case of collision, or to simply create a bulkhead between the load in the trunk separated from the otherwise unprotected passenger space. However, this solution is typically permanent, takes up a lot of space and does not prevent the items from shifting or moving within the grids or guards.

Another solution for items that need to be restrained is the load space barrier or cargo net. These nets may be directly attached to the body structure where the net may confine luggage to the load space during movement of the vehicle. These nets have an advantage over metal guards in that they can be rolled-up when not in use, taking up much less space than a comparable guard. However, these types of barrier or cargo nets are easily tangled, do not accommodate large objects, and are typically not very durable.

Unrelated to box constraint, often time motorists carry other objects in the trunk of their car for emergency situations. During emergency situations, vehicles and motorists are often faced with pulling over on the side of the road and fixing the vehicle, waiting for help, and/or abandoning the vehicle. Being with a vehicle on the side of the road is obviously a dangerous situation. As such, some motorists carry in their trunk devices used to warn passing vehicles of the broken down or abandoned vehicle, and/or motorists on the side of the road. These devices stored in the trunk of the car may include flares, emergency cones/displays, etc. However, one problem with these devices may be that they are rarely used and constantly take up space when not in use. As such, because of desired trunk space and/or the infrequency of emergency situations, some motorists choose not to carry such emergency devices in their car or trunk. As such, there is clearly a need for a device that can be used to signal passing motorists of the vehicle/passengers on the side of the road that is more desirable for motorists to carry around in the trunk of a car.

The instant disclosure is designed to provide a multi-functional box stop device for the trunk of a car that addresses at least some of the above mentioned problems.

SUMMARY

Briefly described, in select embodiments, the present disclosure of a multi-functional box stop device for the trunk of a car includes a multi-functional box stop device comprising a base member having a top surface and a bottom surface; said top surface being substantially flat; said bottom surface being adapted to attach to a desired surface; a raised member attached to said base member and extending approximately vertical from said top surface; and said raised member comprising a first side; and a second side; where said first side and said second side being attached together at an angle of approximately 90 degrees.

These and other features of the multi-functional box stop device for the trunk of a car will become more apparent to one skilled in the art from the prior Summary, and following Brief Description of the Drawings, Detailed Description, and Claims when read in light of the accompanying Detailed Drawings.

BRIEF DESCRIPTION OF THE DRAWINGS

The present multi-functional car trunk accessory device will be better understood by reading the Detailed Description with reference to the accompanying drawings, which are not necessarily drawn to scale, and in which like reference numerals denote similar structure and refer to like elements throughout, and in which:

FIG. 4 is a side view of an example embodiment of the multi-functional box stop device for the trunk of a car from FIG. 1.

FIG. 5 is another side view of an example embodiment of the multi-functional box stop device for the trunk of a car from FIG. 1.

FIG. 9 is another perspective view of an example embodiment of the multi-functional box stop device for the trunk of a car according to select example embodiments with a flag inserted.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the example embodiments of the present disclosure, as illustrated in FIGS. 1-9, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 7:
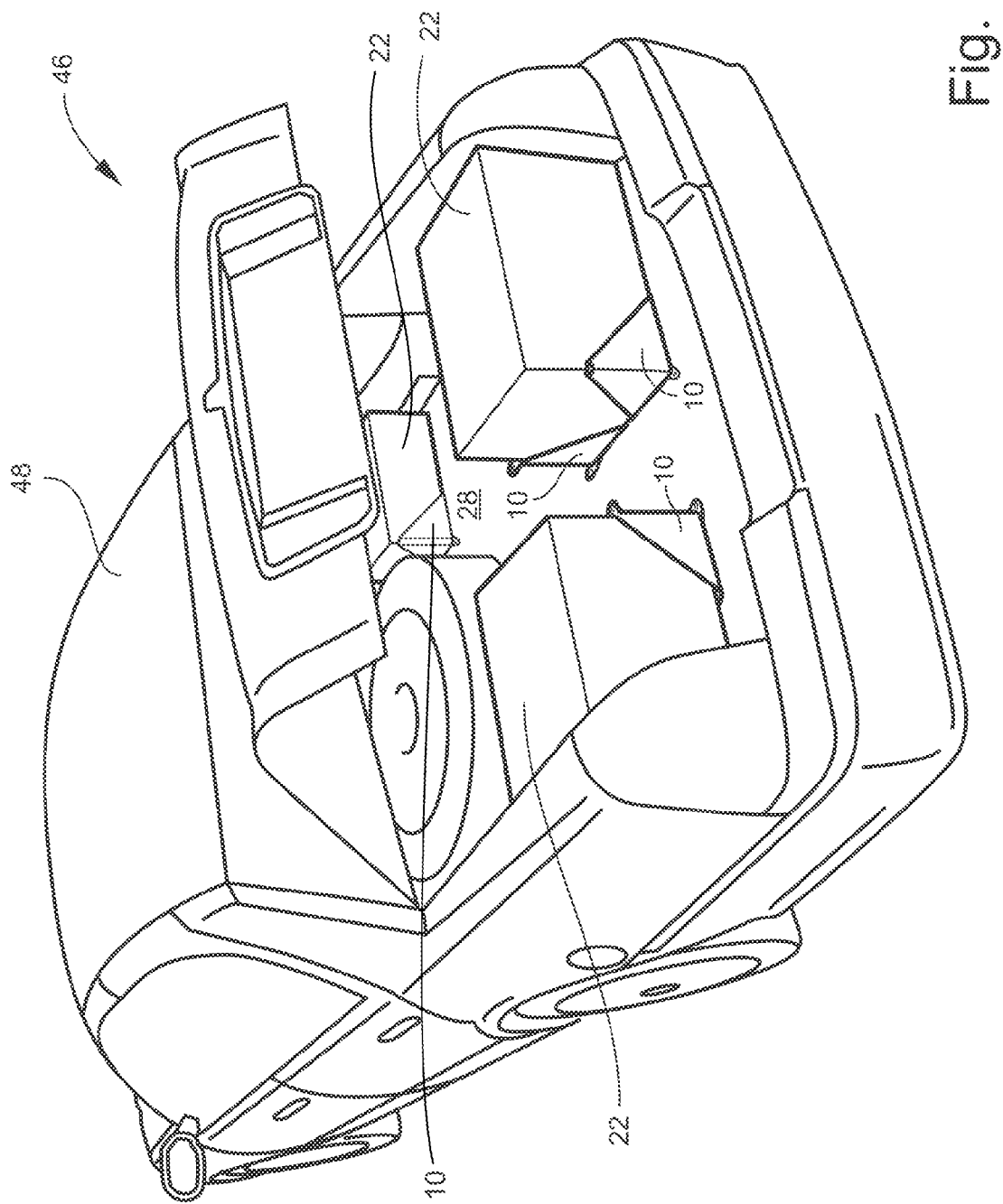
FIG. 7 is a perspective environmental view of a plurality of multi-functional box stop devices for the trunk of a car securing boxes in a trunk according to select example embodiments of the instant disclosure.

Referring now to FIGS. 1-5 by way of example, and not limitation, therein is illustrated an example embodiment of a multi-functional box stop device 10, wherein the device 10 comprises a base member 12 and a raised member 20. The base member 12 may have a top surface 14 and a bottom surface 16. The top surface 14 may be flat, or substantially flat, for allowing an object, like a box, to sit flat on the base member 12. The bottom surface 16 may be adapted to attach to a desired surface 18. The desired surface 18 may be any desired surface where boxes need to be secured or restrained in place, including, but not limited to, the carpet 28 on the floor of a trunk 46, as shown in FIG. 7. The raised member 20 may be attached to the base member 12 and may extend approximately vertical from the top surface 14 of the base member 12. The raised member 20 may include a first side 34 and a second side 35. The first side 34 and the second side 35 may be attached together at an angle 36 of approximately 90 degrees. In one embodiment, the first side 34 and the second side 35 may be attached together with a rounded corner, as shown in the Figures.

Embodiments of the disclosure of the multi-functional box stop device 10 may be highly durable but also highly mobile and relatively light in weight, due to the specific material composition of the device and relative thickness of the material composing the walls of the device. In one embodiment, the device 10 may be made from a light weight, thin material, like plastic. In another embodiment, the device 10 may be made from a more sturdy and durable material, like a metal.

Figure 6:
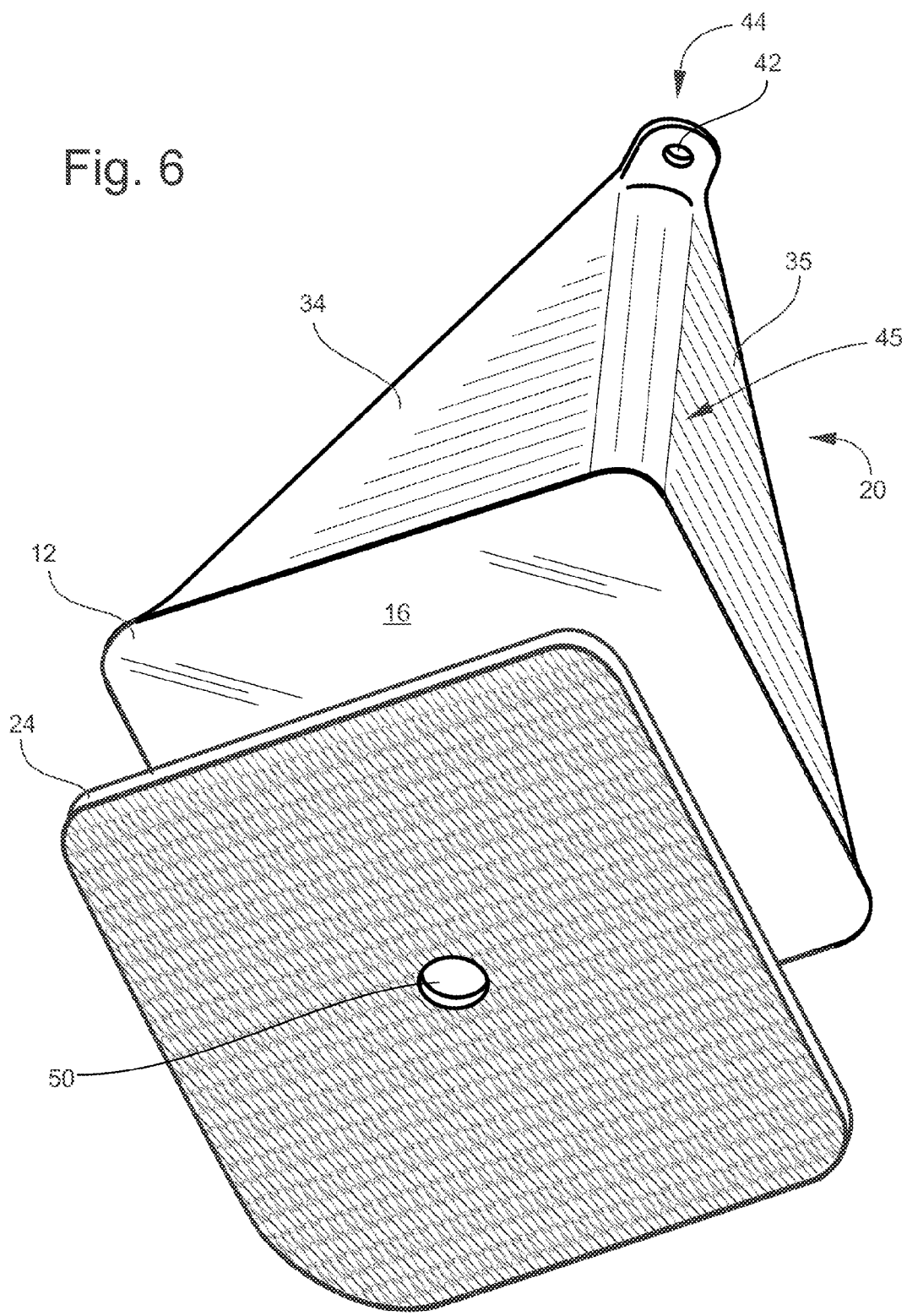
FIG. 6 is a partially disassembled bottom perspective view of an example embodiment of the multi-functional box stop device for the trunk of a car according to at least one embodiment of the instant disclosure.

Referring to FIG. 6, the bottom surface 16 of the multi-functional box stop device 10 may be for securing the device 10 to any desired surface 18. In one embodiment the bottom surface 16 may include a plurality of hooks 24 from a hook and loop type fastener adapted to attach to a plurality of loops from a hook and loop type fastener. These loops may be anywhere or on any desired surface 18, like the loops formed from the carpet 28 in the trunk of a car. However, the invention is not so limited, and may be attached to any surface, whether carpeted or not, having such loops of a hook and loop type fastener device.

Figure 1:
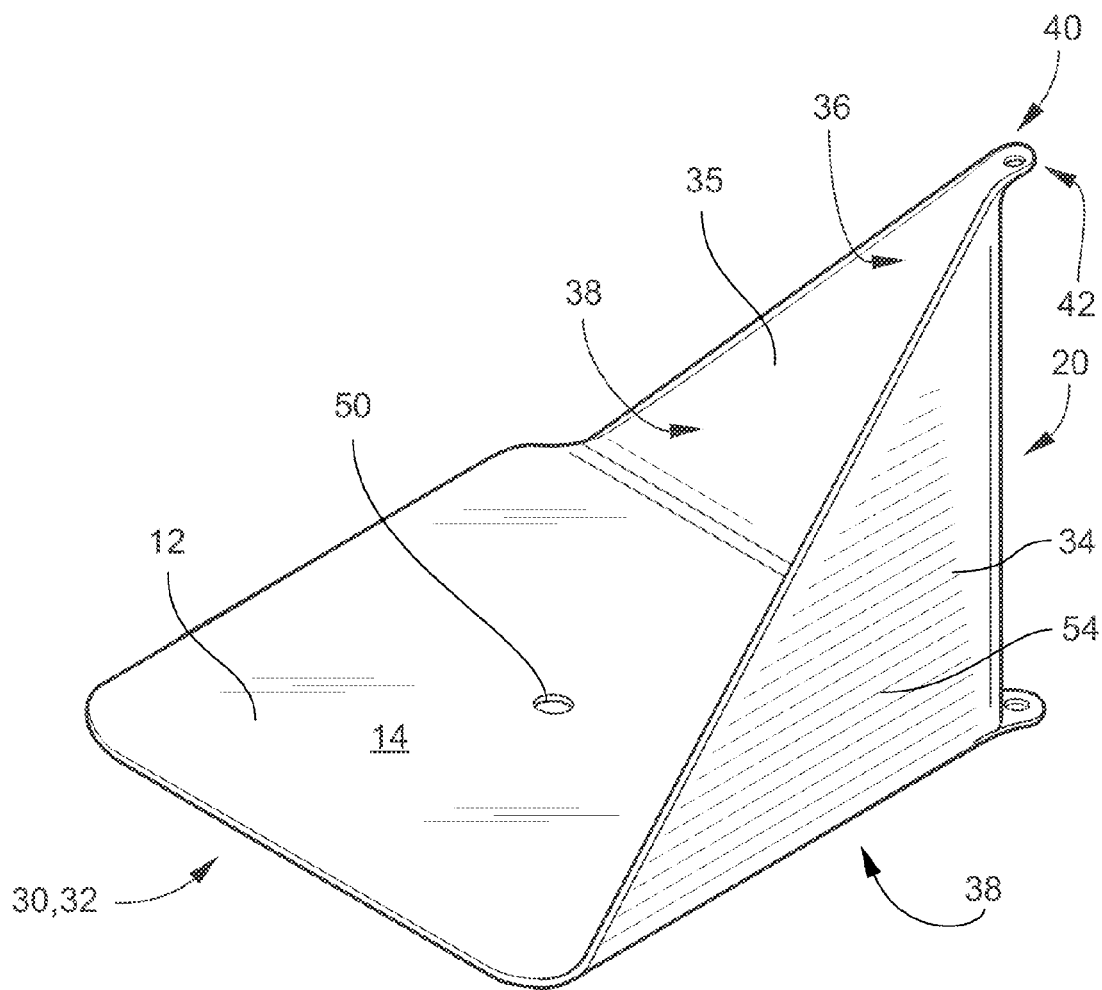
FIG. 1 is a perspective view of a multi-functional box stop device for the trunk of a car according to at least one example embodiment of the instant disclosure.
Figure 2:
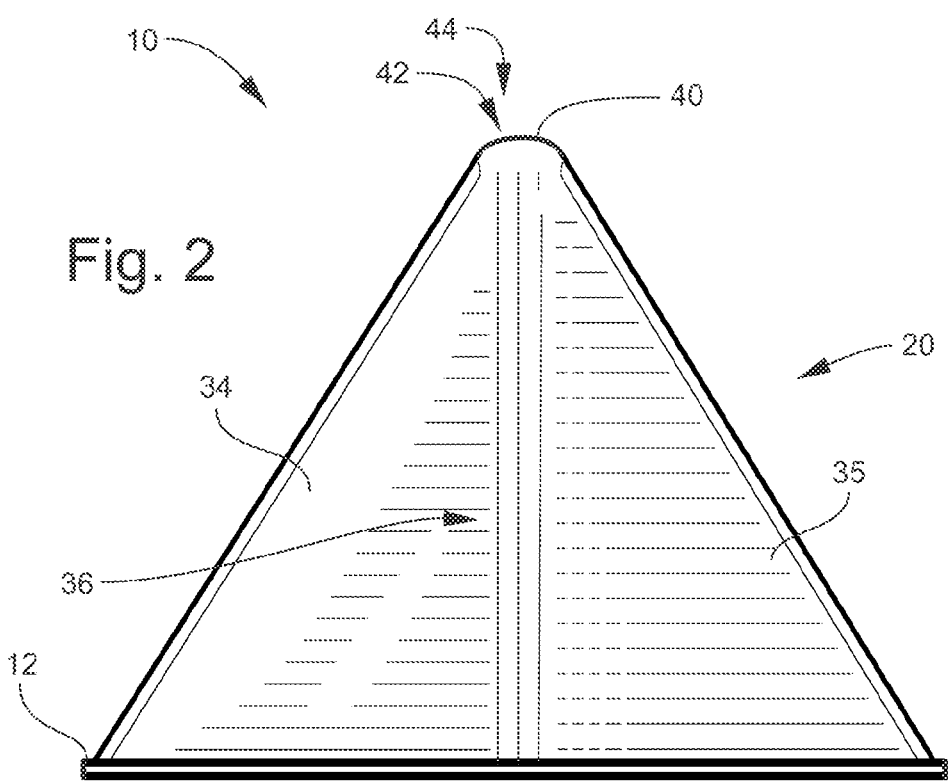
FIG. 2 is a front view of an example embodiment of the multi-functional car trunk accessory device from FIG. 1.
Figure 3:
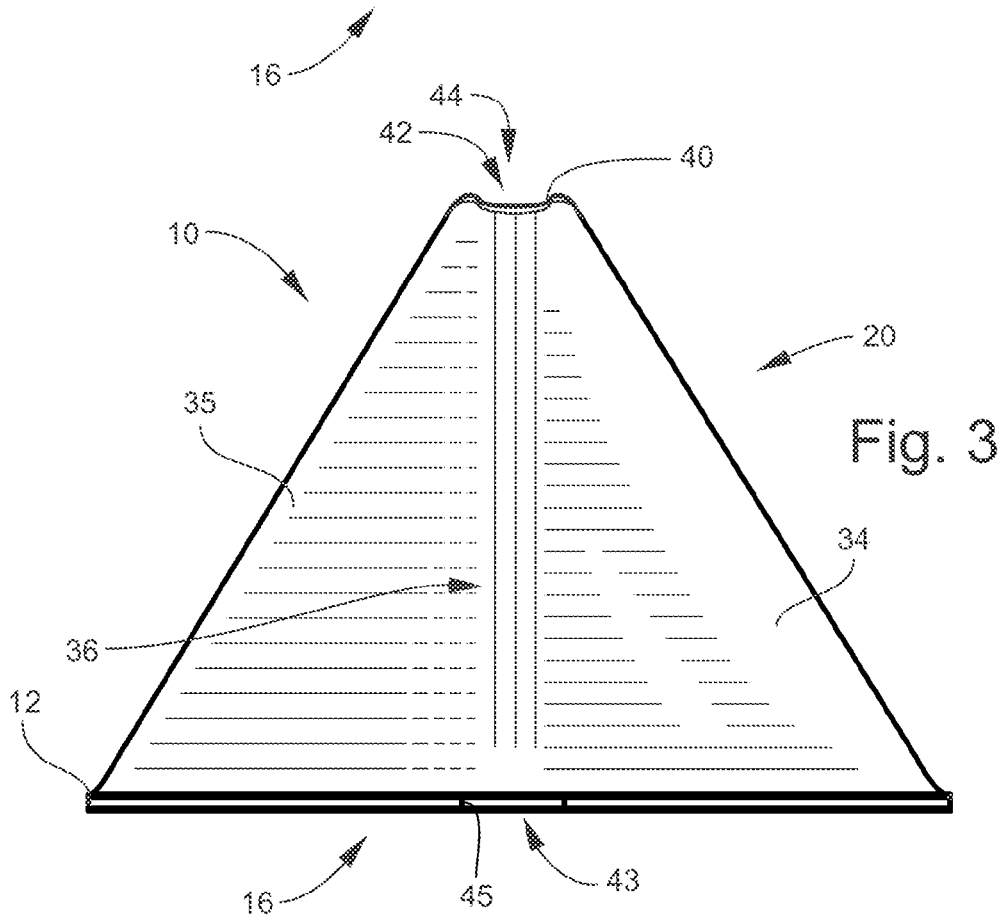
FIG. 3 is a back view of an example embodiment of the multi-functional box stop device for the trunk of a car from FIG. 1.

Referring now to FIGS. 1 and 6, in select embodiments the bottom surface 16 may include a bottom hole 50 for aiding the securing of device 10 to the desired surface 18. The bottom hole 50 may be adapted to allow a nail, screw or other securing device 52 (like nail 52 shown in FIG. 9) to secure the device to the desired surface 18. For certain uses, the bottom hole 50 may be used alone to secure the device 10 to a desired surface, like a flat or smooth surface, corner, etc. Bottom hole 50 may also be used in conjunction with the hooks 24, like for further securing device 10 to a desired surface 18 with loops, like trunk carpet 28.

Example embodiments of the multi-functional box stop device 10 may be designed with any different shapes and sizes, including any different shapes and sizes of the base member 12 and/or raised member 20. In example embodiments, as shown in the Figures, the base member 12 may have a substantially square shape 32 or rectangular shape 30 with rounded corners. In other example embodiments, first side and second side 35 may have substantially triangular shapes 38.

In example embodiments, a curved top section 40 may optionally be included at the top 44 of raised member 20. See FIGS. 1-6. The curved top section 40 may curve away from base member 12 and may be adapted to allow a user to grab and manipulate the device 10 when positioned with a box 22 or other device. In an example embodiment, the curved top section 40 may have a top hole 42 through it. The top hole 42 may be adapted to allow a user to attach a rope or bungee cord for further securing the device 10 in place.

In example embodiments, an ear 45 may be optionally included off of the base member 12. See FIGS. 1-5. The ear 45 may be positioned off of the base member 12 on the same corner as curved top section 40. The ear 45 may include an ear hole 43. The ear hole 43 in ear 45 may align with top hole 42 in curved section 40, whereby the top hole 42 and ear hole 43 may be adapted to receive a flag 56, as shown in FIG. 9, or other similar pole shaped devices. This flag 56 or similar shaped pole devices may be used for many purposes, including, but not limited to, increased visibility of device 10, advertising, etc.

As shown in FIG. 6, in example embodiments, ear 45 may optionally not be included with multi-functional box stop device 10. By providing device 10 without ear 45, device 10 may be stackable. This stackable feature of device 10 may be a desired feature over ear 45 for some users, as it allows multiple devices 10 to be stacked on top of or inside of each other for conserving space. As one skilled in the art should readily understand, this conserved space by stacking the devices 10 may be ideal for users of multiple devices 10 in the same trunk or space.

In other example embodiments, a reflector 54 may be included on multi-functional box stop device 10. See FIGS. 1 and 9. The reflector 54 may be any reflective devices, surface or paint and may be positioned anywhere on device or device 10 may be covered with reflector 54. The reflector 54, as should be obvious to one skilled in the art, may be for increasing the visibility of device 10, especially in dark situations. As shown in FIG. 1, in one embodiment, reflector 54 may be a reflective paint, coating or sticker positioned all over first side 34 and/or second side 35 of raised member 20. As shown in FIG. 9, in an example embodiment, reflector 54 may be a reflective paint, coating or sticker positioned on a portion of first side 34 and/or second side 35 of raised member 20.

Referring to FIG. 7, when the device 10 is positioned with a box 22 where the base member 12 is under the box 22 and the raised member 20 is against the box 22, the bottom surface 16 may hold the device 10 in place on desired surface 18 thereby stopping, restraining or securing the box 22 from moving on the desired surface 18.

Although the instant disclosure is directed herein toward a multi-functional box stop device 10 for the trunk of a car or automobile 48, as shown in FIG. 7, the instant disclosure is not so limited to trunk, cars and/or automobiles, and can be used for other situations where a box needs to be held in position on a desired surface, where a cone or similar device is desired, where a small flag or rod needs to be held, and/or for mounting to the corner or surface of any device for advertising, danger awareness, etc.

In more detail, referring to the disclosure depicted in FIG. 7, the multi-functional box stop device 10 may be used to secure items in the trunk of a car, like boxes, from sliding or shifting. In general, example embodiments of the multi-functional box stop device 10 for the trunk 46 of a car 48, may include a base member 12 and a raised member 20. The base member 12 may have a top surface 14 and a bottom surface 16. The base member 12 may be for providing the base for object like boxes to rest on. The top surface 14 of base member 12 may be flat, or substantially flat, for allowing an object, like a box, to sit flat on the base member 12. In addition, the base member 12 may provide the base for attaching to a desired surface. The bottom surface 16 may be adapted to attach to a desired surface 18. The desired surface 18 may be any desired surface for securing the device in place, including, but not limited to, the carpet 28 on the floor of a trunk 46, or other desired surfaces. Also, base member 12 may provide the base for the attachment of raised member 20. The raised member 20 may be attached to the base member 12 and may extend approximately vertical from the top surface 14 of the base member 12. The raised member 20 may include a first side 34 and a second side 35. The first side 34 and the second side 35 may be attached together at an angle 36 of approximately 90 degrees. The device 10 may also optionally include a curved top section 40 with a top hole 42 and/or an ear 45 off of base member 12 with an ear hole 43.

Still referring to FIG. 7, in one embodiment the multi-functional box stop device 10 may be used for securing items, like boxes, from shifting or sliding in the trunk 46 of a car 48. When the device 10 is positioned with a box 22 where the base member 12 is under the box 22 and the raised member 20 is against the box 22, the bottom surface 16 may hold the device 10 in place thereby stopping the box 22 from moving or shifting on the desired surface 18. This box stop function may be accomplished in numerous manners, including using one or multiple devices 10 on the boxes or other similar objects. For example, if a box 22 is positioned in the corner of the trunk, one device 10 may be positioned on the opposing corner of the box 22 for securing the box in place in the trunk. As another example, if a box 22 is positioned against the wall of the trunk, two devices 10 may be positioned on the two opposing corners of the box 22 from the wall for securing the box in place in the trunk. As yet another example, if the box 22 is positioned in the middle of the trunk, three or four devices 10 may be utilized for securing the box 22 in place.

Figure 8:
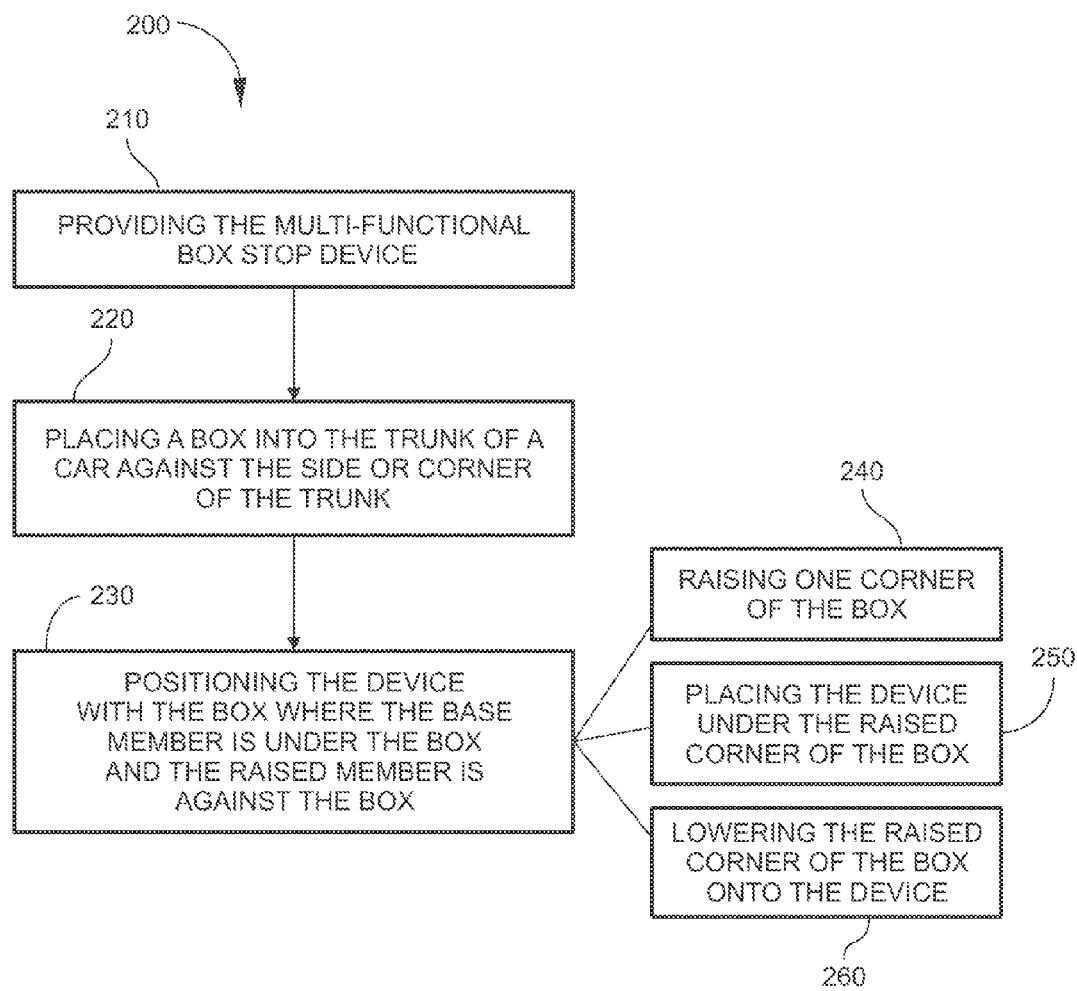
FIG. 8 is a flow chart of an example embodiment of the method of securing a box in place on the floor of a trunk according to select example embodiments of the instant disclosure.

Referring now to FIG. 8, an example embodiment of a method 200 of securing a box in place on the floor of a trunk is shown. In block 210 the multi-functional box stop device 10 is provided, including any of the various embodiments shown and described herein. In block 220, a box is placed into the trunk of a car against the side or corner of the trunk. In block 230, the multi-functional box stop device is positioned with the box where the base member is under the box and the raised member is against the box.

Positioning the multi-functional box stop device 10 with the box where the base member 12 is under the box and the raised member 20 is against the box may include one or more of blocks 240, 250, and 260. In block 240, one corner of the box is raised. In block 250, the multi-functional box stop device is placed under the raised corner of the box. And finally, in block 260, the raised corner of the box is lowered onto the box stop.

Referring to FIG. 9, multi-functional box stop device 10 may optionally be used as a flag holder. In general, example embodiments of the multi-functional box stop device as a flag holder may include a base member 12 and a raised member 20. The base member 12 may have a top surface 14 and a bottom surface 16. The base member 12 may be for providing the base for device 10 to stand up. The top surface 14 of base member 12 may be flat, or substantially flat, for allowing an object, like a box, to sit flat on the base member 12, thereby securing device 10 upright. In addition, the base member 12 may provide the base for attaching to a desired surface. The bottom surface 16 may be adapted to attach to a desired surface 18. The desired surface 18 may be any desired surface for securing the device in place. Also, base member 12 may provide the base for the attachment of raised surface 20. The raised member 20 may be attached to the base member 12 and may extend approximately vertical from the top surface 14 of the base member 12. The raised member 20 may include a first side 34 and a second side 35. The first side 34 and the second side 35 may be attached together at an angle 36 of approximately 90 degrees. The device 10 may also include a curved top section 40 with a top hole 42 and an ear 45 off of base member 12 with an ear hole 43. The ear hole 43 may align with the top hole 42, whereby the top hole 42 and ear hole 43 are adapted to receive flag 56.

As shown in FIG. 9, in this example embodiment, device 10 may be used as a flag holder, like a desk flag holder. As should be apparent by one skilled in the art, device 10 may be used as a flag holder anywhere a flag is desired for advertisement or danger indication, like stairs. The hook layer 24 may aid in positioning and securing the flag holder device 10 on various desired surfaces 18. In addition, the bottom hole 50 may be adapted to allow a nail, screw or other securing device 52 to secure the device to the desired surface 18. As such, the hoop layer and/or bottom hole 50 may be used for positioning securing the flag holder device 10 in place on any desired surface 18.

Along with these unique functions of a box stop and/or flag holder, as described above and shown in FIGS. 7-9, the multi-functional box stop device 10 may also be used in many different desired functions or applications. As merely examples, the device 10 may be used as: an emergency signal cone in which the device 10 is placed outside of a car to alert oncoming traffic (flag 56 and/or reflector 54 may increase the visibility); and a surface or corner mount, where device 10 may be mounted to a surface or corner, which in combination with flag 56 and/or reflector 54, may advertise the flag 56 on any surface or corner and/or indicate directions or location of danger in area, or any other desired uses. The device 10 may also be used for any other desired functions or applications as apparent from the instant disclosure or later discovered as useful by the user.

The foregoing description and drawings comprise illustrative embodiments. Having thus described example embodiments, it should be noted by those skilled in the art that the within disclosures are example only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A multi-functional box stop device comprising:
a thin planar base member having a substantially square or rectangular shape with a flat top surface and a bottom surface adapted to attach to a desired surface;
a raised member attached to the base member on two adjacent sides and extending approximately vertical from the top surface, the raised member comprising:
a thin planar first side having a substantially triangular shape;
a thin planar second side having a substantially triangular shape,
the first side and the second side being attached together at an angle of approximately 90 degrees;
a first reflector and a second reflector, wherein:
said first reflector is positioned on said first side, said first reflector having a substantially triangular shape matching said substantially triangular shape of said first side with sides parallel to said substantially triangular shape of said first side; and
said second reflector is positioned on said second side, said second reflector having a substantially triangular shape matching said substantially triangular shape of said second side with sides parallel to said substantially triangular shape of said second side.

2. The multi-functional box stop device of claim 1 wherein, when the device is positioned with a box where the base member is under the box and the raised member is against the box, the bottom surface holds the device in place thereby stopping the box from moving on the desired surface.

3. The multi-functional box stop device of claim 1, wherein the raised member comprises a curved top section curving away from the base member and adapted to allow a user to grab and manipulate the box stop device when positioned with a box.

4. The multi-functional box stop device of claim 3, wherein said curved top section comprises a top hole adapted for attaching a rope or bungee cord for further securing the box stop device in place.

5. The multi-functional box stop device of claim 4, wherein the base member comprises an ear with an ear hole, the ear hole aligning with the top hole, whereby the top hole and ear hole are adapted to receive a flag.

6. The multi-functional box stop device of claim 1, wherein the bottom surface comprises a plurality of hooks from a hook and loop type fastener adapted to attach to a plurality of loops from a hook and loop type fastener.

7. The multi-functional box stop device of claim 6, wherein the plurality of loops comprises trunk carpet.

8. The multi-functional box stop device of claim 1, wherein the bottom surface comprises a bottom hole adapted to allow a nail, screw or other securing device to secure the device to said desired surface.

9. The multi-functional box stop device of claim 1, wherein the base member has rounded corners.

10. The multi-functional box stop device of claim 1 wherein said first reflector and said second reflector being a reflective paint, coating or sticker.

11. A multi-functional box stop device comprising:
a base member having a substantially square or rectangular shape with a flat top surface and a bottom surface adapted to attach to a desired surface;
a raised member attached to the base member and extending approximately vertical from the top surface, the raised member comprising:
a first side having a substantially triangular shape; and
a second side having a substantially triangular shape,
the first side and the second side being attached together at an angle of approximately 90 degrees;
a curved top section curving away from the base member and adapted to allow a user to grab and manipulate the box stop device when positioned with a box, said curved top section comprises a top hole adapted for attaching a rope or bungee cord for further securing the box stop device in place; and
an ear with an ear hole, the ear hole aligning with the top hole, whereby the top hole and ear hole are adapted to receive a flag.

12. A multi-functional box stop device comprising:
a base member having a substantially square or rectangular shape with a flat top surface and a bottom surface adapted to attach to a desired surface;
a raised member attached to the base member and extending approximately vertical from the top surface, the raised member comprising:
a first side having a substantially triangular shape; and
a second side having a substantially triangular shape,
the first side and the second side being attached together at an angle of approximately 90 degrees;
said raised member further comprising:
a curved top section curving away from the base member and adapted to allow a user to grab and manipulate the box stop device when positioned with a box, said curved top section comprises a top hole adapted for attaching a rope or bungee cord for further securing the box stop device in place, and an ear with an ear hole, the ear hole aligning with the top hole, whereby the top hole and ear hole are adapted to receive a flag; and/or
a reflector positioned on said first side, and/or on said second side.

13. The multi-functional box stop device of claim 1, wherein the substantially triangular shape of said second side matching the substantially triangular shape of said first side.

* * * * *